US006828292B2

(12) United States Patent
Noyes et al.

(10) Patent No.: US 6,828,292 B2
(45) Date of Patent: Dec. 7, 2004

(54) DOMESTIC FABRIC ARTICLE REFRESHMENT IN INTEGRATED CLEANING AND TREATMENT PROCESSES

(75) Inventors: Anna Vadimovna Noyes, Hamilton, OH (US); John Christopher Deak, West Chester, OH (US); Jeffrey John Scheibel, Loveland, OH (US); Phillip Kyle Vinson, Fairfield, OH (US); Frederick Anthony Hartman, Cincinnati, OH (US); James Charles Theophile Roger Burckett-St. Laurent, Lasne (BE); John Cort Severns, West Chester, OH (US); Arseni V. Radomyselski, Hamilton, OH (US); Paul Amaat France, West Chester, OH (US); Jerome Howard Collins, Cincinnati, OH (US); Christiaan Arthur Jacques Kamiel Thoen, West Chester, OH (US); Nabil Yaqub Sakkab, Cincinnati, OH (US)

(73) Assignee: Procter & Gamble Company, Cincinnati, OH (US)

( * ) Notice: Subject to any disclaimer, the term of this patent is extended or adjusted under 35 U.S.C. 154(b) by 137 days.

(21) Appl. No.: 09/849,842

(22) Filed: May 4, 2001

(65) Prior Publication Data

US 2002/0007519 A1 Jan. 24, 2002

Related U.S. Application Data

(60) Provisional application No. 60/209,443, filed on Jun. 5, 2000.

(51) Int. Cl.[7] ................................................ B08B 3/10
(52) U.S. Cl. ......................... 510/287; 510/516; 134/10
(58) Field of Search ................................ 510/516, 227; 134/10

(56) References Cited

U.S. PATENT DOCUMENTS

| 3,635,667 A | 1/1972 | Keay et al. |
| 3,663,160 A | 5/1972 | Stone et al. |

(List continued on next page.)

FOREIGN PATENT DOCUMENTS

| CA | 1 239 326 | 7/1988 |
| DE | 2108 991 | 8/1972 |
| DE | 4131589 A1 | 5/1986 |
| DE | 3739711 A | 6/1989 |
| DE | 296 00 628 U1 | 6/1997 |
| DE | 198 10907 A1 | 9/1999 |
| EP | 1 451 600 A | 10/1976 |
| EP | 1 509 315 | 5/1978 |
| EP | 0 091 261 A2 | 10/1983 |
| EP | 0 118 625 A2 | 9/1984 |
| EP | 0182583 A2 | 5/1986 |
| EP | 0410 068 A1 | 1/1991 |
| EP | 0 422 787 A2 | 4/1991 |
| EP | 0 566 240 A1 | 10/1993 |
| EP | 0 679 754 A2 | 11/1995 |
| EP | 0 716 870 A1 | 6/1996 |
| EP | 0 479 146 B1 | 12/1996 |
| EP | 0 767 267 A1 | 4/1997 |
| EP | 0 962519 A1 | 12/1999 |
| EP | 982 023 A2 | 3/2000 |
| EP | 1 041 189 A1 | 10/2000 |
| EP | 1 043 443 A1 | 10/2000 |
| EP | 1 092 803 A1 | 4/2001 |
| FR | 2 268 898 A1 | 6/1993 |
| GB | 1549180 | * 7/1979 |
| GB | 2 084 204 A | 4/1982 |
| GB | 2 230 022 A | 10/1990 |
| GB | 2 251 867 A | 7/1992 |
| JP | 1098-798 A | 4/1989 |
| JP | 1188-595 A | 7/1989 |
| JP | 2166-198 A | 6/1990 |
| JP | 2202-599 A | 8/1990 |
| JP | 2222-496 A | 9/1990 |
| JP | 3046-300 A | 2/1991 |
| JP | 3063-799 A | 3/1991 |
| JP | 04323299 A | 11/1992 |
| JP | 05051598 A | 3/1993 |
| JP | 05239766 A | 9/1993 |
| JP | 08073837 A | 3/1996 |
| JP | 09143497 A | 6/1997 |
| JP | 10-017891 | 1/1998 |
| JP | 11-092784 | 4/1999 |
| JP | 11-323381 | 11/1999 |
| JP | 11-323383 | 11/1999 |
| JP | 00144175 A | 5/2000 |
| JP | 2000-192085 | 7/2000 |
| JP | 00290689 A | 10/2000 |
| WO | WO 82/02218 A1 | 7/1982 |
| WO | WO 94/01227 A1 | 1/1994 |
| WO | WO 96/30471 A2 | 10/1996 |
| WO | WO 97/35061 A1 | 9/1997 |
| WO | WO 98/07405 A1 | 2/1998 |
| WO | WO 98/16615 A1 | 4/1998 |
| WO | WO 99/27046 | * 6/1999 |
| WO | WO 99/57358 | 11/1999 |
| WO | WO 00/04221 | 1/2000 |
| WO | WO 00/04222 | 1/2000 |

(List continued on next page.)

OTHER PUBLICATIONS

US 6,001,133, 12/1999, DeYoung et al. (withdrawn)
Trilo et al.; "Critical Micelle Density for the Self–Assembly of Block Copolymer Surfactants in Supercritical Carbon Dioxide"; pp. 416–421.
Sarbu et al.; "Non–Fluorous Polymers with Very High Solubility in Supercritical $Co_2$ Down to Low Pressures"; pp. 165–168.

*Primary Examiner*—John Hardee
(74) *Attorney, Agent, or Firm*—Caroline Wei-Berk; Kim W. Zerby; Steve W. Miller

(57) ABSTRACT

Fabric article treatment in a domestic appliance having at least one detergency step, products therefor, and kits which combine treatment products for more effective results.

9 Claims, No Drawings

U.S. PATENT DOCUMENTS

| | | | |
|---|---|---|---|
| 3,854,871 A | 12/1974 | Eanzel et al. | |
| 4,077,770 A | 3/1978 | Rouvellat et al. | |
| 4,097,397 A | 6/1978 | Mizutani et al. | |
| 4,102,824 A | 7/1978 | Mizutani et al. | |
| 4,111,034 A | 9/1978 | Hubner | |
| 4,137,044 A | 1/1979 | Flower et al. | |
| 4,207,072 A | 6/1980 | Schuierer et al. | |
| 4,267,077 A | 5/1981 | Niimi et al. | |
| 4,639,321 A | 1/1987 | Barrat et al. | |
| 4,685,930 A | 8/1987 | Kasprzak | |
| 4,708,807 A | 11/1987 | Kemerer | |
| 4,761,896 A | 8/1988 | Miyata | |
| 4,909,962 A | 3/1990 | Clark | |
| 5,037,485 A | 8/1991 | Chromecek et al. | |
| 5,046,337 A | 9/1991 | Ro et al | |
| 5,057,240 A * | 10/1991 | Madore et al. | 252/174.15 |
| 5,116,426 A | 5/1992 | Yokohama et al. | |
| 5,271,775 A | 12/1993 | Asano et al. | |
| 5,302,313 A | 4/1994 | Asano et al. | |
| 5,360,571 A | 11/1994 | Kilgour et al. | |
| 5,427,697 A * | 6/1995 | Swartley | 510/525 |
| 5,443,747 A | 8/1995 | Inada et al. | |
| 5,503,681 A | 4/1996 | Inada et al. | |
| 5,503,778 A | 4/1996 | Liu et al. | |
| 5,520,827 A | 5/1996 | Danner | |
| 5,593,507 A | 1/1997 | Inada et al. | |
| 5,597,792 A | 1/1997 | Klier et al. | |
| 5,628,833 A | 5/1997 | McCormack et al. | |
| 5,668,102 A * | 9/1997 | Severns et al. | 510/504 |
| 5,670,476 A * | 9/1997 | Vogel et al. | 510/500 |
| 5,676,705 A | 10/1997 | Jureller et al. | |
| 5,683,473 A | 11/1997 | Jureller et al. | |
| 5,683,977 A | 11/1997 | Jureller et al. | |
| 5,690,750 A | 11/1997 | Inada et al. | |
| 5,705,562 A | 1/1998 | Hill | |
| 5,707,613 A | 1/1998 | Hill | |
| 5,716,456 A | 2/1998 | Inada et al. | |
| 5,722,781 A | 3/1998 | Yamaguchi | |
| 5,741,365 A | 4/1998 | Inada et al. | |
| 5,767,062 A * | 6/1998 | Trinh et al. | 510/516 |
| 5,769,962 A | 6/1998 | Inada et al. | |
| 5,783,092 A | 7/1998 | Brown et al. | |
| 5,811,383 A | 9/1998 | Klier et al. | |
| 5,858,022 A | 1/1999 | Romack et al. | |
| 5,865,852 A | 2/1999 | Berndt | |
| 5,866,005 A | 2/1999 | DeSimone et al. | |
| 5,876,510 A | 3/1999 | Kuemin et al. | |
| 5,877,133 A | 3/1999 | Good | |
| 5,888,250 A | 3/1999 | Hayday et al. | |
| 5,929,012 A | 7/1999 | Del Duca et al. | |
| 5,942,007 A | 8/1999 | Berndt et al. | |
| 5,944,996 A | 8/1999 | DeSimone et al. | |
| 5,954,869 A | 9/1999 | Elfersy et al. | |
| 5,977,040 A | 11/1999 | Inada et al. | |
| 5,977,045 A | 11/1999 | Murphy | |
| 5,985,810 A | 11/1999 | Inada et al. | |
| 6,013,683 A | 1/2000 | Hill et al. | |
| 6,042,617 A | 3/2000 | Berndt | |
| 6,042,618 A | 3/2000 | Berndt et al. | |
| 6,056,789 A | 5/2000 | Berndt et al. | |
| 6,059,845 A | 5/2000 | Berndt et al. | |
| 6,060,546 A | 5/2000 | Powell et al. | |
| 6,063,135 A | 5/2000 | Berndt et al. | |
| 6,086,635 A | 7/2000 | Berndt et al. | |
| 6,114,295 A | 9/2000 | Murphy | |
| 6,131,421 A | 10/2000 | Jureller et al. | |
| 6,136,766 A | 10/2000 | Inada et al. | |
| 6,148,644 A | 11/2000 | Jureller et al. | |
| 6,156,074 A | 12/2000 | Hayday et al. | |
| 6,177,399 B1 | 1/2001 | Mei et al. | |
| 6,200,352 B1 | 3/2001 | Romack et al. | |
| 6,200,393 B1 | 3/2001 | Romack et al. | |
| 6,200,943 B1 | 3/2001 | Romack et al. | |
| 6,204,233 B1 | 3/2001 | Smith et al. | |
| 6,228,826 B1 | 5/2001 | DeYoung et al. | |
| 6,242,408 B1 | 6/2001 | Elms et al. | |
| 6,258,130 B1 | 7/2001 | Murphy | |
| 6,273,919 B1 | 8/2001 | Hayday | |
| 6,309,425 B1 | 10/2001 | Murphy | |
| 6,310,029 B1 * | 10/2001 | Kilgour et al. | 510/466 |
| 6,313,079 B1 | 11/2001 | Murphy et al. | |
| 6,368,359 B1 | 4/2002 | Perry et al. | |
| 2001/0020308 A1 | 9/2001 | Murphy | |
| 2001/0034912 A1 | 11/2001 | Kilgour et al. | |
| 2002/0004953 A1 | 1/2002 | Perry et al. | |
| 2002/0115582 A1 | 8/2002 | Perry et al. | |
| 2002/0174493 A1 | 11/2002 | Perry et al. | |

FOREIGN PATENT DOCUMENTS

| | | |
|---|---|---|
| WO | WO 00/63340 | 10/2000 |
| WO | WO 01/06051 A1 | 1/2001 |
| WO | WO 01/34613 A1 | 5/2001 |
| WO | WO 01/34706 A1 | 5/2001 |
| WO | WO 01/40567 A1 | 6/2001 |
| WO | WO 01/94678 A1 | 12/2001 |
| WO | WO 01/94681 A1 | 12/2001 |
| WO | WO 01/94684 A1 | 12/2001 |

* cited by examiner

DOMESTIC FABRIC ARTICLE REFRESHMENT IN INTEGRATED CLEANING AND TREATMENT PROCESSES

RELATED APPLICATIONS

This application claims priority under 35 U.S.C. § 119(e) to U.S. Provisional Application Ser. No. 60/209,443 of which was filed on Jun. 5, 2000.

FIELD OF THE INVENTION

The present invention relates to fabric article treatment or refreshment in a domestic appliance having at least one detergency step, to products for conducting such treatment or refreshment, and to kits which combine fabric article treatment products for more effective results.

BACKGROUND OF THE INVENTION

Fabric articles, such as mixed bundles of consumer garments and/or footwear are cleaned and further treated with compositions other than cleaning compositions in various ways. These include treating the fabric articles by:

(a) washing them in a washing machine and drying them in a dryer in the presence of a fabric-softener loaded substrate article;

(b) washing them in a washing machine, then treating them with fabric softener, then transferring them to a dryer;

(c) washing them and treating them with fabric softener in a combined washer-dryer using water as the predominant fluid; and (d) washing or treating them in a non-domestic appliance, such as a supercritical fluid cleaning machine or a dry-cleaning machine, for example using supercritical carbon dioxide as the predominant fluid.

Typically the fabric articles have to be separated according to the textile of which they are made or according to their color, before such washing can be done. Additionally so-called "home dry cleaning" compositions have recently become available. These offer imperfect cleaning and are used exclusively in tumble-dryers, where only very small amounts of organic fluids can be used without fire hazards or other problems. Moreover, some recent innovations in appliances for commercial and/or service business use a predominant fluid which is other than water and/or liquified carbon dioxide. For example, the predominant fluid can be a silicone or fluorocarbon. Conventional dry-cleaning uses perchloroethylene, Stoddard solvent, or other hydrocarbons and/or azeotropic mixtures of volatile compounds. None of the present alternatives offer the consumer the degree of convenience and satisfaction that would be available if they could treat a mixed, preferably unseparated, bundle of fabric articles in a single series of cleaning and finishing operations in a single appliance at home. Perhaps the closest available treatment is that which is conducted in a combined washer-dryer, however, even in this case such appliances have no provision for using let alone recovering any fluids other than water. Moreover, there has apparently been little effort in the art to fully harness and exploit the cleaning and fabric care advantages of processes having more than one fluid.

BACKGROUND ART

U.S. Pat. No. 4,137,044, Economics Laboratory Inc. describes a laundry method, all taking place in an aqueous laundry bath, including the step of laundering oil soiled fabric in a particularly defined lipophilic surfactant composition and subsequently laundering such fabric with a hydrophilic surfactant based detergent system. More particularly described is a multi-step process for laundering oil soiled fabric, said process comprising: laundering said fabric in a first aqueous bath including a lipophilic surfactant which imparts oil-solubilizing characteristics to said first aqueous bath, separating said fabric from said first aqueous bath, laundering said fabric in a second hydrophilic aqueous bath including hydrophilic detergent and separating said fabric from said second hydrophilic aqueous bath.

JP--05009862 A, Kanebo (Derwent Accession Number 1993-062193 [08]) describes a process comprising washing a silk fabric grafted with vinyl monomer by a weak alkaline chemical agent such as sodium tripolyphosphate, hydrosulphite, or Marseilles soap. washing with water, drying, and thereafter clumping under immersion in an organic solvent. The organic solvent may be a low dielectric constant solvent e.g. tetrachloroethylene, mineral terpene, or a dry cleaning liquid. The softening process of the graft silk fabric is asserted to impart softness without using a softening agent. The process is not apparently used to treat bundles of manufactured clothing, and is not conducted in a home applicance.

U.S. Pat. No. 4,259,251 and U.S. Pat. No. 4,337,209, Unilever, do not related to laundry processes. They describe a process for production of of fatty acid soaps comprising extracting sludge (esp. sewage sludge which may be crude or activated, and/or co-settled) of solids content>=15 wt. % with a non-polar solvent to recover fatty materials which are then saponified in presence of a dipolar aprotic solvent of dielectric constant>=15.

See also by way of background numerous recently described concentrated cleaning appliances, including those which use silicones, fluorocabons, carbon dioxide and the like—several of these are referenced and adapted to the present purposes in the disclosures hereinafter.

SUMMARY OF THE INVENTION

A "predominant fluid" refers to the majority component of a liquid under operating conditions of a laundering appliance. For example, in conventional dry-cleaning, perchloroethylene is the predominant fluid. In conventional home laundering, water is the predominant fluid. In some recently developed processes, supercritical carbon dioxide, silicones or perfluorocarbons are the predominant fluid. Carbon dioxide is a gas under normal conditions but becomes a fluid suitable for cleaning when compressed at high pressures. In applications included in general in the present invention, e.g., microemulsion cleaning, a predominant fluid need not be more than 50% of all fluids present. For example, in a mixture of water and three other fluids, A, B, and C, in the proportions water: 30%, B: 25%, C: 25%, D:20%, water is by the present definition the predominant fluid. A fluid used in treatment of fabric articles may moreover be a solvent or nonsolvent for body soils. For example, processes are known which use perfluorobutylamine as the predominant fluid. However, perfluorobutylamine is a nonsolvent for body soils. A "lipophilic cleaning fluid" as further defined hereinafter is a fluid having at least the physical and safety characteristics of dry cleaning fluids, which in addition is at least partially liquid at atmospheric pressures and at at least one temperature in the range 0 deg. C. to 60 deg. C. (in other words, carbon dioxide, air and ntrogen, for example, are not included). Moreover a lipophilic cleaning fluid as defined herein is at least partially a solvent for body soils as defined in the test methods hereinafter (in other words, perfluorobutylamine is excluded).

The present invention encompasses a process for treating fabric articles, comprising the steps of:
(a) in a first laundering appliance, washing a load of fabric articles in the presence of a predominant fluid and at least one cleaning composition comprising a surfactant;
(b) in said first laundering appliance, at least partially removing said cleaning composition from said load of fabric articles;
(c) in said first laundering appliance, at least one step of treating said load of fabric articles with a fabric article refreshment composition in the presence of a lipophilic cleaning fluid;
(d) in said first laundering appliance, removing said lipophilic cleaning fluid from said fabric articles; and
(e) optionally, recovering said lipophilic cleaning fluid.

Processes encompassed include those wherein step (a) is selected from:
(i) an immersive washing step wherein water is said predominant fluid;
(ii) a non-immersive washing step wherin water is said predominant fluid;
(iii) an immersive washing step wherein a lipophilic cleaning fluid is said predominant fluid;
(iv) a non-immersive washing step wherein a lipophilic cleaning fluid is said predominant fluid;
(v) an immersive washing step wherein a fluidized dense gas is said predominant fluid; and
(vi) a non-immersive washing step wherein a fluidized dense gas is said predominant fluid.

Preferred processes herein do not include the use of dense gas and especially involve a cleaning step or steps which are either substantially aqueous or substantially nonaqueous, use concentrated media, and, more preferably still, have low energy requirement. This includes both immersive and non-immersive concentrated process steps. The preferred processes include those which are conducted without separating or grouping the fabric articles by color or by type, i.e., mixed bundles of "dry-clean only" and "machine washable" articles are treated in a preferred process. Likewise-, mixed bundles of colored and non-colored articles are treated in a preferred process.

It will be observed that the present processes have in common the at least partial removal of a predominant fluid after a cleaning step, combined with the use of a lipophilic cleaning fluid in at least one fabric article refreshment step. Without being limited by theory, it is believed that this combination does at least one, and in preferred embodiments both of, (i) effectively cancelling out carryover effects of agents used in the cleaning step which otherwise adversely affect the fabric article refreshment step and (ii) eliminating one or more shortcomings of current home dry cleaning kits which, as conducted in tumble-dryers, require bags, have very little fluid present, etc.

The invention has numerous other advantages, for example permitting a much more convenient cleaning and refreshment capability for the consumer.

The invention includes both the process, and compositions, kits, etc. which can be used in the process.

All percentages and proportions herein are by weight and units are S.I units unless otherwise specifically indicated. All documents referred to are incorporated herein in their entirety.

DETAILED DESCRIPTION OF THE INVENTION

The phrase "dry weight of a fabric article" as used herein means the weight of a fabric article that has no intentionally added fluid weight.

The phrase "absorption capacity of a fabric article" as used herein means the maximum quantity of fluid that can be taken in and retained by a fabric article in its pores and interstices. Absorption capacity of a fabric article is measured in accordance with the following Test Protocol for Measuring Absorption Capacity of a Fabric Article.

Test Protocol for Measuring the Absorption Capacity of a Fabric Article

Step 1: Rinse and dry a reservoir or other container into which a lipophilic fluid will be added. The reservoir is cleaned to free it from all extraneous matter, particularly soaps, detergents and wetting agents.

Step 2: Weigh a "dry" fabric article to be tested to obtain the "dry" fabric article's weight.

Step 3: Pour 2 L of a lipophilic fluid at ~20 C into the reservoir.

Step 4: Place fabric article from Step 2 into the lipophilic fluid-containing reservoir.

Step 5: Agitate the fabric article within the reservoir to ensure no air pockets are left inside the fabric article and it is thoroughly wetted with the lipophilic fluid.

Step 6: Remove the fabric article from the lipophilic fluid-containing reservoir.

Step 7: Unfold the fabric article, if necessary, so that there is no contact between same or opposite fabric article surfaces.

Step 8: Let the fabric article from Step 7 drip until the drop frequency does not exceed 1 drop/sec.

Step 9: Weigh the "wet" fabric article from Step 8 to obtain the "wet" fabric article's weight.

Step 10: Calculate the amount of lipophilic fluid absorbed for the fabric article using the equation below.

$$FA=(W-D)/D*100$$

where:
FA=fluid absorbed, % (i.e., the absorption capacity of the fabric article in terms of % by dry weight of the fabric article)
W=wet specimen weight, g
D=initial specimen weight, g By the term "non-immersive" it is meant that essentially all of the fluid is in intimate contact with the fabric articles. There is at most minimal amounts of "free" wash liquor. It is unlike an "immersive" process where the washing fluid is a bath in which the fabric articles are either submerged, as in a conventional vertical axis washing machine, or plunged into, as in a conventional horizontal washing machine. The term "non-immersive" is defined in greater detail according to the following Test Protocol for Non-Immersive Processes. A process in which a fabric article is contacted by a fluid is a non-immerisive process when the following Test Protocol is satisfied.

Test Protocol for Non-Immersive Processes

Step 1: Determine absorption capacity of a fabric specimen using Test Protocol for Measuring Absorption Capacity of a Fabric Article, described above.

Step 2: Subject a fabric article to a fluid contacting process such that a quantity of the fluid contacts the fabric article.

Step 3: Place a dry fabric specimen from Step 1 in proximity to the fabric article of Step 2 and move/agitate/tumble the fabric article and fabric specimen such that fluid transfer from the fabric article to the fabric specimen takes place (the fabric article and fabric specimen must achieve the same saturation level).

Step 4: Weigh the fabric specimen from Step 3.

Step 5: Calculate the fluid absorbed by the fabric specimen using the following equation:

$$FA=(W-D)/D*100$$

where:

FA=fluid absorbed, %

W=wet specimen weight, g

D=initial specimen weight, g

Step 6: Compare the fluid absorbed by the fabric specimen with the absorption capacity of the fabric specimen. The process is non-immersive if the fluid absorbed by the fabric specimen is less than about 0.8 of the absorption capacity of the fabric specimen.

Appliances for Use with the Present Process

In one aspect, the present invention relates to a process. The process is carried out in the home of a consumer in a single laundry appliance, and preferably is carried out using a mixed load of fabric articles such as clothing articles having mixed textile composition and/or mixed color.

In general, any suitable appliance can be used for the present process. Typically, a suitable appliance can be one dedicated for the process, or can be one which is the result of modifying or retrofitting a known appliance so that it will conduct the process.

The preferred type of appliance is one having dimensions approximately compatible with current domestic washing-machines and tumble dryers.

The present processes have in common the at least partial removal of a predominant fluid, preferably water but also possibly including other predominant fluids ranging from subcritical liquid carbon dioxide to hydrocarbons or linear (see for example U.S. Pat. No. 5,977,040 or U.S. Pat. No. 5,443,747) or cyclic silicones, after a cleaning step, combined with the use of a particularly selected lipophilic cleaning fluid in at least one fabric article refreshment step. Preferred embodiments can also include single or progressive rinses in the presence of the lipophilic cleaning fluid, between cleaning with a first predominant fluid and fabric article refreshment composition in the presence of the lipophilic cleaning fluid. Moreover preferred embodiments can include recovering and/or recovering the lipophilic cleaning fluid.

The present process can for example be conducted in a modified version of a home laundering appliance originally designed for concentrated aqueous clearing, see for example U.S. Pat. No. 4,489,455, Spendel. The minimum modification needed is to provide storage and delivery means for the lipophilic fluid, which will be used in addition to a first predominant fluid, water, in that appliance. Further modification can include recovery means, at minimum an additional storage tank, for spent fluid, but a separator can also be incorporated to separate lipophilic cleaning fluid from other materials, e.g., water and/or solid soils.

Likewise the present process can be conducted in a purpose-built appliance, for example one of the non-immersive purpose-built or modified appliances disclosed in copending cofiled commonly assigned patent application serial No. 60/209,468, filed on Jun. 5, 2000. Such a purpose built appliance can have advantages, for example in overall minimizing use of the lipophilic cleaning fluid, although the amount of lipophilic cleaning fluid will remain well in excess of, for example, the amounts of organic solvents used in current home dry-cleaning products the volume use of which is constrained by current conventional tumble-driers.

Alternately the present process can be conducted in a modified tumble-dryer, however, the tumble dryer will then have to be extensively modified so as to allow for the use of both a first predominant fluid and the lipophilic cleaning fluid. Tumble-dryers are not, for example, conventionally plumbed to water and drain lines.

In yet another suitable variation, the present process can be conducted in modifications of new concentrated washing appliances available in commerce from Whirlpool and others. See, for example U.S. Pat. No. 5,219,370, U.S. Pat. No. 5,199,127, U.S. Pat. No. 5,191,669, U.S. Pat. No. 5,191,668, U.S. Pat. No. 5,167,722, U.S. Pat. No. 4,784,666 all assigned to Whirlpool. The modifications needed are similar to those needed for the Spendel appliance referred to supra.

Other suitable variations of appliances for use in the present process include downsized versions of appliances originally designed for dry-cleaning only or more particularly, commercial dry-cleaning, including, but not limited to, dry-cleaning using subcritical or supercritical carbon dioxide. Such appliances include those of the following references: FR2762623 A1, Whirlpool, U.S. Pat. No. 5,996,155, U.S. Pat. No. 5,482,211, U.S. Pat. No. 5,282,381 and U.S. Pat. No. 5,822,818, Raytheon and/or Hughes Aircraft, WO200001871 A1, Fedegari Autoclavi, U.S. Pat. No. 5,344,493, D. P. Jackson, JP11276795 A, NGK Insulators, EP828021 A and U.S. Pat. No. 5,881,577, Air Liquide, DE4416785 A1, D. Kannert, U.S. Pat. No. 5,412, 958 and WO9401227 A1 Clorox.

Another variation of appliance that can be used in conjunction with the present process is a downsized version of an appliance as disclosed by Greenearth Inc., see for example the following references: U.S. Pat. No. 5,865,852, U.S. Pat. No. 5,942,007, U.S. Pat. No. 6,042,617, U.S. Pat. No. 6,042,618, U.S. Pat. No. 6,056,789, U.S. Pat. No. 6,059,845, U.S. Pat. No. 6,063,135. The Greeneath system in its current state is once again primarily designed for commercial dry-cleaning. Modification of such an appliance, which in fact uses a silicone which is a suitable lipophilic cleaning fluid herein, will include the provision of means to handle another predominant fluid, e.g., water.

Preferred appliances for use herein generally include those having a perforated drum which can be used in a centrifuging mode, preferably at the high end of, or higher than, the speeds and G-force ranges of current leading-edge laundry appliances.

In accordance with the present invention, the fabric articles to be treated and/or cleaned may be contacted with an impinging gas at any time during the method of the present invention.

It is desirable that the fabric articles are contacted by an impinging gas at least prior to applying the cleaning fluid. The impinging gas facilitates the removal particulate soils from the fabric articles. Particulate soils can be successfully removed using gas flow. Particulate soils include any soil that is comprised of discrete particles. Nonlimiting examples of such particulate soils include clay, dust, dried mud, sand, cat fur, skin flakes or scales, dander, dandruff, hair from people or pets, grass seeds, pollen, burrs, and/or similar animal, mineral or vegetable matter which is insoluble in water.

By utilizing the impinging gas, "demand" on chemicals in the process for removing such particulate soils is reduced.

Typically, the impinging gas is flow from a gas source at a rate of from about 10 l/s to about 70 l/s and the gas contacts the fabric articles at a velocity of from about 1 m/s to about 155 m/s. It is desirable to mechanically agitate the fabric articles while the gas impinges on the fabric articles. Further, it is desirable to remove the gas, and particulate soils in the gas from the fabric articles at a rate sufficient to prevent the removed particulate soils from re-depositing upon the fabric articles.

In one embodiment of the present invention the gas is selected from the group consisting of air, nitrogen, ozone, oxygen, argon, helium, neon, xenon, and mixtures thereof, more preferably air, nitrogen, ozone, oxygen, argon, helium, and mixtures thereof, even more preferably still air, ozone, nitrogen, and mixtures thereof.

In another embodiment of the present invention the gas used in the method can be varied over time. For example air could be used at the start of the process, a mixture of air and ozone used in the middle stages of the process and air or nitrogen could be used at the end.

The gas used may be of any suitable temperature or humidity. Heat could be supplied to the gas electrically or by passing the gas over a gas flame, such as, is done in a conventional gas dryer. However, room temperature and humidity gas are preferred.

In one embodiment of the present invention two or more gases could be mixed in a mixing chamber before being used in the process. In another aspect of this embodiment of the present invention the gases could be delivered concurrently through different entry points and mix in-situ in the walled vessel. In another aspect of this embodiment of the present invention the gases supplied could exist as mixture and would not require any mixing chamber to achieve the required mixture of gas for the process.

In one embodiment of the present invention the gas could be available from storage, such as from pressurized containers. Alternatively, the gas used in the process could be obtained from the location where the process and device occur. For example, a pump, blower, or the like, may be used to supply air from the surrounding atmosphere for the process of the invention. A combination of gas available from storage and from the atmosphere is also envisioned.

In another embodiment of the present invention the gas can be obtained from a compressor. The compressor may be any compressor suitable for providing gas or gases, provided that they supply the gas to the apparatus within the required velocity and flow rate ranges. The compressors are linked to the gas inlet(s) by an appropriate fixture, such as a hose, pipe, tap, fixture or combinations thereof, to provide the inlet(s) with the gas or gases within the required velocity and flow rate ranges. Some typical compressors, which are suitable for providing gas or gases, include rotary screw compressors or two-stage electrical compressor. Another suitable type of compressor is the so-called "acoustical compressor", such as those described in U.S. Pat. Nos. 5,020,977, 5,051,066, 5,167,124, 5,319,938, 5,515,684, 5,231,337, and 5,357,757, all of which are incorporated herein by reference. Typically, an acoustical compressor operates in the following fashion: A gas is drawn into a pulse chamber, such as air from the atmosphere, compressed, and then discharged as a high-pressure gas. The gas is compressed by the compressor sweeping a localized region of electromagnetic, for example microwaves, laser, infrared, radio etc, or ultrasonic energy through the gas in the pulse chamber at the speed of sound. This sweeping of the pulse chamber creates and maintain a high-pressure acoustic pulse in the gas. These acoustical compressors have many advantages over conventional compressors. For example, they have no moving parts besides the valves, operate without oil, and are much smaller than comparable conventional compressors.

In one embodiment of the present invention the gas is provided from a gas source at a rate of from about 10 l/s to about 70 l/s, more preferably, about 20 l/s to about 42 l/s, even more preferably about 25 l/s to about 30 l/s. The gas flow rate is measure by a flow meter place in the internal space of the vessel close to where the gas enters the vessel containing the clothes.

In one embodiment of the present invention the gas contacts the fabric articles at a velocity of from about 1 m/s to about 155 m/s, more preferably, about 50 m/s to about 105 m/s even more preferably about 75 m/s to about 105 m/s. The gas velocity is measure by a flow meter place in the internal space of the vessel close to where the gas enters the vessel containing the clothes.

The velocity at which the gas contacts the fabric articles and the flow rate of the gas are critical parameters. For example insufficient velocity, means that the particulates are not removed from the fabric articles. Too great a velocity and the fabric articles are disrupted such that the fabric articles cannot be agitated and the particulate soils cannot be removed. Similarly, insufficient flow rate of the gas means that any particulate soils removed remain and can be re-deposited on the fabric article after cleaning.

Lipophilic Cleaning Fluids for Use with the Present Process: Qualification of Lipophilic Cleaning Fluid and Lipophilic Cleaning Fluid Test (LCF Test).

Any non-aqueous fluid that is both capable of meeting known requirements for a dry-cleaning fluid (e.g, flash point etc.) and is capable of at least partially dissolving sebum is suitable as a lipophilic fluid herein. The ability of a particular material to remove sebum can be measured by any known technique. As a general guideline, perfluorobutylamine (Fluorinert FC-43®) on its own (with or without adjuncts) is a reference material which by definition unsuitable as the lipophilic cleaning fluid herein (it is essentially a nonsolvent) while linear and cyclic siloxanes such as, but not limited to, D5 or other cyclopentasiloxanes, have suitable sebum-dissolving properties and dissolve sebum.

The following is a preferred method for investigating and qualifying other materials, e.g., other low-viscosity, free-flowing silicones, for use as the lipophilic cleaning fluid. The method uses commercially available Crisco® canola oil, oleic acid (95%, Sigma Aldrich Co.) and squalene (99%, J. T. Baker) as model soils for sebum. The test materials should be substantially anhydrous and free from added cleaning adjuncts, or other adjuncts during evaluation.

Prepare three vials. Place 1.0 g of Crisco canola oil in the first; in a second vial place 1.0 g of oleic acid (95%), and in a third and final vial place 1.0 g of squalene (99.9%). To each vial add 1 g of the solvent or fluid to be tested for lipophilicity. Separately mix at room temperature and pressure each vial containing the lipophilic soil and the fluid to be tested for 20 seconds on a standard vortex mixer at maximum setting. Place vials on the bench and allow to settle for 15 minutes at room temperature and pressure. If, upon standing, a single phase is formed with any one or more of the three lipophilic soils, then the fluid qualifies as suitable for use as a "lipophilic cleaning fluid" (including a garment treatment fluid for non-cleaning purposes) in accordance with the invention. However, if two or more separate layers are formed in all three vials, then the amount of fluid dissolved in the oil phase will need to be further determined before rejecting or accepting the fluid as qualified.

In such a case, with a syringe, carefully extract a sample from each layer in each vial. The experiment can be adjusted in scale, if needed, for example such that about 200 microliter samples can be taken. The syringe-extracted layer samples are placed in GC autosampler vials and subjected to conventional GC analysis after determining the retention time of calibration samples of each of the three models soils and the fluid being tested. If more than 1% of the test fluid by GC, preferably greater, is found to be present in a syringe-sampled layer, then the test fluid is also qualified for use as a lipophilic cleaning fluid. If needed, the method can be further calibrated using heptacosafluorotributylamine, i.e., Fluorinert FC-43 (fail) and cyclopentasiloxane (pass).

A suitable GC is a Hewlett Packard Gas Chromatograph HP5890 Series II equipped with a split/splitless injector and FID. A suitable column used in determining the amount of lipophilic fluid present is a J&W Scientific capillary column DB-1HT, 30 meter, 0.25 mm id, 0.1 um film thickness cat# 1221131. The GC is suitably operated under the following conditions:

Carrier Gas: Hydrogen
Column Head Pressure: 9 psi
Flows: Column Flow @ ~1.5 ml/min.
 Split Vent @ ~250–500 ml/min.
 Septum Purge @ 1 ml/min.
Injection: HP 7673 Autosampler, 10 ul syringe, 1 ul injection
Injector Temperature: 350° C.
Detector Temperature: 380° C.
Oven Temperature Program:initial 60° C. hold 1 min.
 rate 25° C./min.
 final 380° C. hold 30 min.

Preferred Lipophilic Cleaning Fluids suitable for use herein can further be qualified for use on the basis of having an excellent garment care profile. Garment care profile testing is well known in the art and involves testing a fluid to be qualified using a wide range of garment or fabric article components, including fabrics, threads and elastics used in seams, etc., and a range of buttons. Preferred lipophilic cleaning fluids for use herein have an excellent garment care profile, for example they have a good shrinkage or fabric puckering profile and do not appreciably damage plastic buttons. For purposes of garment care testing or other qualification, e.g., flammability, a primary solvent for use in the lipophilic cleaning fluid can be present in a mixture, e.g., with water, at approximately the ratio to be used in the final cleaning fluid which will come into contact with fabric articles in the appliance. Certain materials which in sebum removal qualify for use lipophilic cleaning fluids, for example ethyl lactate, can be quite objectionable in their tendency to dissolve buttons, and if such a material is to be used in the lipophilic cleaning fluid, it will be formulated with water and/or other solvents such that the overall mix is not substantially damaging to buttons. D5, for example, meets the garment care requirements quite admirably.

A highly preferred group of lipophilic cleaning fluids includes linear and cyclic siloxanes having having a normal boiling point of from about 180 deg. C. to about 250 deg. C. and a viscosity of no more than about 10 cS, dipropylene glycol dimethyl ether, diproplyene glycol n-propyl ether, propylene glycol n-butyl ether and mixtures thereof. Such fluids can be further modified.

Lipophilic solvents can include linear and cyclic polysiloxanes, hydrocarbons and chlorinated hydrocarbons. More preferred are the linear and cyclic polysiloxanes and hydrocarbons of the glycol ether, acetate ester, lactate ester families. Preferred lipophilic solvents include cyclic siloxanes having a boiling point at 760 mm Hg. of below about 250° C. Specifically preferred cyclic siloxanes for use in this invention are octamethylcyclotetrasiloxane, decamethylcyclopentasiloxane, and dodecamethylcyclohexasiloxane. Preferably, the cyclic siloxane comprises decamethylcyclopentasiloxane (D5, pentamer) and is substantially free of octamethylcyclotetrasiloxane (tetramer) and dodecamethylcyclohexasiloxane (hexamer).

However, it should be understood that useful cyclic siloxane mixtures might contain, in addition to the preferred cyclic siloxanes, minor amounts of other cyclic siloxanes including octamethylcyclotetrasiloxane and hexamethylcyclotrisiloxane or higher cyclics such as tetradecamethylcycloheptasiloxane. Generally the amount of these other cyclic siloxanes in useful cyclic siloxane mixtures will be less than about 10 percent based on the total weight of the mixture. The industry standard for cyclic siloxane mixtures is that such mixtures comprise less than about 1% by weight of the mixture of octamethylcyclotetrasiloxane.

Accordingly, the lipophilic fluid of the present invention preferably comprises more than about 50%, more preferably more than about 75%, even more preferably at least about 90%, most preferably at least about 95% by weight of the lipophilic fluid of decamethylcyclopentasiloxane. Alternatively, the lipophilic fluid may comprise siloxanes which are a mixture of cyclic siloxanes having more than about 50%, preferably more than about 75%, more preferably at least about 90%, most preferably at least about 95% up to about 100% by weight of the mixture of decamethylcyclopentasiloxane and less than about 10%, preferably less than about 5%, more preferably less than about 2%, even more preferably less than about 1%, most preferably less than about 0.5% to about 0% by weight of the mixture of octamethylcyclotetrasiloxane and/or dodecamethylcyclohexasiloxane.

Optional Process Technologies Having Cleaning Effect

Process technologies where not otherwise specifically mentioned and optionally used with the present invention that have known cleaning effect can vary widely and include ozonizers, ultrasonics devices, electrolysis devices and ion exchange columns.

Optional Process Technologies Having other than Cleaning Effect

Process technologies where not otherwise specifically mentioned and optionally used with the present invention that have primarily other than cleaning effect include especially control technologies including automatic dispensers, safety-related technologies, noise control technologies, and energy and loopback process control technologies involving sensing a parameter and adjusting the process in function of the result detected.

Solvents

Where not specifically included in other components of the present invention, solvents can be used in variable proportion to adjust the compositions or to provide dilution at the point of use. Solvents include both polar and apolar, high-dielectric constant and low-dielectric constant, protic and aprotic types. Solvents include water, linear and cyclic silicones, hydrocarbons, alcohols, ethers, esters, ketones, mixed functional group solvents such as glycol ethers, fluorocarbons, hydrofluorocarbons, azeotropic solvent mixtures, and the like.

Adjunct Ingredients

Adjunct materials for use in conjunction with processes and compositions herein can vary widely and can be used at widely ranging levels, for example from about 0.0001 ppm to about 20% when diluted at the final point of use in the process. Catalytic and/or colored adjuncts, such as dyes, are often present in use at the lower end of the level range, whereas low molecular weight noncatalytic materials are often, but not necessarily generally, used at higher levels. Where not specifically indicated, adjuncts will in general be used in level ranges known from the art.

Adjuncts include detersive enzymes such as proteases, amylases, cellulases, lipases and the like, as well as other catalytic materials, e.g., bleach catalysts, including the macrocyclic types having manganese or similar transition metals.

Adjunct materials which are catalytic, for example enzymes, can be used in "forward" or "reverse" modes, a discovery independently useful from the specific appliances of the present invention. For example, a lipolase or other hydrolase may be used, optionally in the presence of alcohols as ajuncts, to convert fatty acids to esters, thereby increasing their solubility in the lipophilic cleaning fluid. This is a "reverse" operation, in contrast with the normal use of this hydrolase in water to convert a less water soluble fatty ester to a more water-soluble material. In any event, any adjunct ingredient must be suitable for use in combination with the lipophilic fluid.

Suitable cleaning additives include, but are not limited to, amines and alkanolamines including the lower alkanolamines specifically including TEA, MDEA and/or MEA, amphiphilic polymers where not elsewhere included, aesthetics modifiers, antibacterial agents including but not limited to diclosan, triclosan, 5-chlorosalicylanilide, and various other salicylanilide derivatives, antifungal agents, anti-graying agents, anti-oxidants including water-soluble types such as ascorbic acid and lower-water soluble types such as sterically hindered aromatics including but not limited to BHT, antiparasitic agents, anti-redeposition agents, anti-tarnishing agents, biological control agents other than families specifically recited herein, bleach activators including in particular hydrophobic (more particlarly including NOBS and its lower and higher homologs) and cationic or zwitterionic types, bleach boosters, bleach catalysts, bleaches (including oxidizing and reducing types, more particularly including phthalimidoperoxycaproic acid or PAP, magnesium monoperoxyphthalate and/or DPDA (bleaches are further discussed, for example, in M. E. Burns, Surfactant Sci. Ser. (1998), 71(Powdered Detergents), 165–203), boosters for suds or foam, buffering agents for acidity, buffering agents for alkalinity, builders, catalytic antibodies, cellulose and/or chitin derivatives, chaotropic agents, chelants for heavy metal ions including S,S'-EDDS, DTPA, HEDP, conventional di- and tri-phosphonates, and hydrophobic variants of any of said chelants, clays including laponite and other hectorites, bentonites and/or montmorillonites; colorants, corrosion inhibitors, coupling agents, crystal growth inhibitors, demulsifiers or emulsion-breakers, diamines, polyamines and/or their alkoxylates, dispersants including but not limited to alkenyl succinic anhydrides and/or Ircosperse 2175 and 2176 available from Lubrizol, divalent or trivalent ions, dye transfer inhibitors, dyes, electrolytes, emulsifiers, enzyme stabilizers, enzymes, fabric softening agents, fatty alcohols, fatty esters, finishing aids, fluorescent agents, foam or suds stabilizing agents, humectants, hydrotropes, insect repellents, lime soap dispersants, metal ion salts, minerals, naturally derived, e.g., botanical adjuncts or actives, non-chelating sequestrants for metal ions, odor control agents, odor neutralizers, optical brighteners, perfumes, pH control agents, photobleaches, polyelectrolytes, processing aids, pro-perfumes, rheology modifiers other than thickeners, e.g., thinners, skin emollients and/or other dermatological benefit agents, soil release polymers, soil repellants, solvent stabilizers, suppressors for suds or foams, surfactants, textile absorbency modifiers, textile sensory modifiers, thickeners, virucidal agents, waterproofing agents, wetting agents, charge-balancing ions, stabilizers, benefit agents and other drycleaning or laundering adjuncts other than those included in the foregoing, and mixtures thereof.

Surfactants for Aqueous and Non-Aqueous Cleaning

Surfactants, hydrotropes, emulsifiers or wetting agents used, for example, in the cleaning step of the present process, may in general be anionic, nonionic, cationic or amphoteric/zwitterionic and can have a linear, slightly branched (including, but not limited to, mid chain monomethyl mid and 2-position methyl branched), substantially branched, cyclic, or polycyclic hydrophobic moiety. Hydrotropes and wetting agents will generally have shorter chains or hydrophobic moieties comprising fewer atoms in total. Surfactants will have a wide range of total number of atoms, e.g., carbon atoms, in their hydrophobes, for example from about 6 to about 20, depending on whether rapid kinetics at low temperature, or maximum equilibrium effect in surface tension reduction are required. Surfactants useful herein will likewise encompass a wide range of surfactant parameter, depending for example on whether they are required to be interfacially active at a water phase boundary or at a non-aqueous phase boundary. Emulsifiers can be monomeric or polymeric, are often selected from nonionic surfactants having emulsifying properties, and can have a wide range of HLB.

Preferred surfactants for use herein are mixtures of two or more surfactants, and include in one preferred embodiment, a surfactant mixture which comprises a surfactant other than a nonionic surfactant, typically this is an anionic surfactant.

Surfactants useful herein can come from broadly differing classes, for example recitals of surfactants for use in aqueous laundering are ubiquitous in patents of Procter and Gamble, Unilever, Henkel, Colgate, Kao, Lion and other assignees. These are not, however, the only types of surfactants useful in the present process.

Another family of surfactants is that selected for use in conventional drycleaning. Such a family of surfactants commonly includes types, such as dialkylsulfosuccinates, certain phosphate esters having one or two hydrophobes, acid forms of surfactant, ammonium salts of conventional anionic surfactants, and even oils such as fatty alcohols, which are unusual as or are simply not used as surfactants in conventional aqueous detergency. For example, illustrative of anionic surfactants reapplicable herein but generally of types disclosed for use in dry-cleaning include include dodecylbenzene sulfonic acid, sodium dodecylbenzene sulfonate, potassium dodecylbenzene sulfonate, triethanolamine dodecylbenzene sulfonate, morpholinium dodecylbenzene sulfonate, ammonium dodecylbenzene sulfonate, isopropylamine dodecylbenzene sulfonate, sodium tridecylbenzene sulfonate, sodium dinonylbenzene sulfonate, potassium didodecylbenzene sulfonate, dodecyl diphenyloxide disulfonic acid, sodium dodecyl diphenyloxide disulfonate, isopropylamine decyl diphenyloxide disulfonate, sodium hexadecyloxypoly(ethyleneoxy) (10)ethyl sulfonate, potassium octylphenoxypoly(ethyleneoxy) (9)ethyl sulfonate, sodium alpha olefin sulfonate, sodium hexadecane-1 sulfonate, sodium ethyl oleate sulfonate, potassium octadecenyl-succinate, sodium oleate, potassium laurate, triethanolamine myristate, morpholinium tallate, potassium tallate, sodium lauryl sulfate, diethanolamine lauryl sulfate, sodium laureth (3) sulfate, ammonium laureth (2) sulfate, sodium nonylphenoxypoly(ethyleneoxy) (4) sulfate, sodium diisobutylsulfosuccinate, disodium lauryl-sulfosuccinate, tetrasodium N-laurylsulfosuccinimate, sodium decyloxypoly(ethyleneoxy(5)methyl)carboxylate, sodium octylphenoxypoly(ethyleneoxy(8)methyl)-carboxylate, sodium mono decyloxypoly(ethyleneoxy) (4)phosphate, sodium di decyloxypoly(ethyleneoxy) (6)phosphate, and potassium mono/di octylphenoxypoly(ethyleneoxy)

(9)phosphate. Other anionic surfactants known in the art may also be employed.

Among the useful nonionic surfactants which may be employed are octylphenoxypoly(ethyleneoxy) (11)ethanol, nonylphenoxypoly(ethyleneoxy) (13)ethanol, dodecylphenoxypoly(ethyleneoxy) (10)ethanol, polyoxyethylene (12) lauryl alcohol, polyoxyethylene (14) tridecyl alcohol, lauryloxypoly(ethyleneoxy) (10)ethyl methyl ether, undecylthiopoly(ethyleneoxy) (12)ethanol, methoxypoly (oxyethylene(10)/(oxypropylene(20))-2-propanol block co-polymer, nonyloxypoly(propyleneoxy) (4)/(ethyleneoxy) (16)ethanol, dodecyl polyglycoside, polyoxyethylene (9) monolaurate, polyoxyethylene (8) monoundecanoate, polyoxyethylene (20) sorbitan monostearate, polyoxyethylene (18) sorbitol monotallate, sucrose monolaurate, lauryldimethylamine oxide, myristyldimethylamine oxide, lauramidopropyl-N,N-dimethylamine oxide, 1:1 lauric diethanolamide, 1:1 coconut diethanolamide, 1:1 mixed fatty acid diethanolamide, polyoxyethylene(6)lauramide, 1:1 soya diethanolamidopoly(ethyleneoxy) (8) ethanol, and coconut diethanolamide. Other known nonionic surfactants may likewise be used.

Illustrative useful cationic surfactants include a mixture of n-alkyl dimethyl ethylbenzyl ammonium chlorides, hexadecyltrimethylammonium methosulfate, didecyldimethylammonium bromide and a mixture of n-alkyl dimethyl benzyl ammonium chlorides. Similarly useful amphoteric surfactants include cocamidopropyl betaine, sodium palmityloamphopropionate, N-coco beta-aminopropionic acid, disodium N-lauryliminodipropionate, sodium coco imidazoline amphoglycinate and coco betaine. Other cationic and amphoteric surfactants known to the art may also be utilized. Additional surfactant classes which are useful in the practice of the present invention are surface-active polymers and surfactants which comprise at least one $CO_2$-philic moiety and at least one $CO_2$-phobic moiety, or other surfactants known for use in supercritical fluid cleaning. See, for example, Supercrit. Fluid Clean. (1998), 87–120 and references therein. Such surfactant classes are well known in commerce, and are conveniently but nonexhaustively listed in patent publications such as: U.S. Pat. No. 5,683,977, Unilever; U.S. Pat. No. 6,001,133, Micell; U.S. Pat. No. 5,789,505, Air Products.

Fabric Softeners

Fabric softeners or conditioners useful herein can have linear or branched, saturated or unsaturated hydrophobes and can include certain amines, quaternary amines, or protonated amines, or mixtures thereof. Such materials particularly include diesters of diethanolammonium chlorides (I), sometimes termed "diester quats"; dialkyl imidazoline esters (II) or the corresponding amides wherein NH replaces O in formula (II), diesters of triethanolammonium methylsulfates (III), ester amide-tertiary amines sometimes termed amidoamineesters (IV), esteramide-quaternary amine chloride salts (V), and diesters of dihydroxypropyl ammonium chlorides (VI).

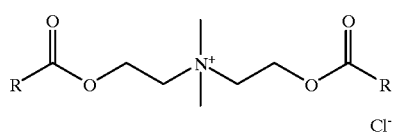

(I)

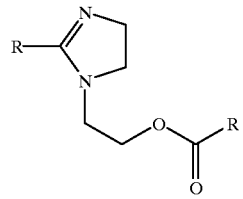

(II)

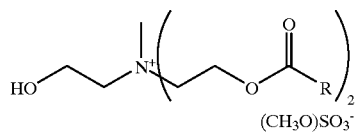

(III)

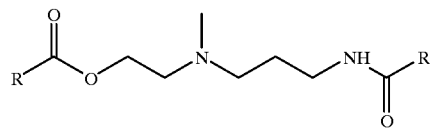

(IV)

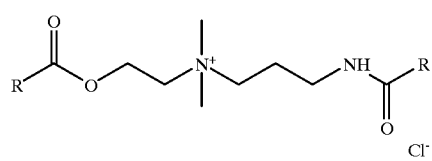

(V)

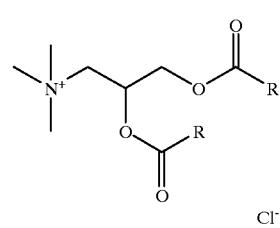

(VI)

Fabric softeners of structure (I) can, for example, be the product of reacting hard or soft tallow fatty acid, oleic acid, canola acid or other unsaturated acids of varying iodine number with N-methyldiethanolamine followed by quaternizing with methyl halide, or more generally, any suitable alkylating agents, e.g., dimethylsulfate, in isopropanol, ethanol or other suitable solvents. Fabric softeners of structure (II) can, for example, be prepared by reacting hard or soft tallow fatty acid, oleic acid, canola acid or other unsaturated acids of varying iodine number with aminoethylethanolamine in the presence of a suitable catalyst and further catalytically ring-closing converting the resulting intermediate. The corresponding amides wherein NH replaces O in formula (II) can be prepared analogously by substituting diethylenetriamine for aminoethylethanolamine. Fabric softeners of structure (III) can be prepared similarly to those of structure (I) substituting triethanolamine for N-methyldiethanolamine, however complex mixtures of monoester, diester shown in structure (III), and triester are typical. Fabric softeners of structure (IV) can be prepared from the amine $HO(CH_2)_2N(CH_3)(CH_2)_3$ in turn prepared from N-methylethanolamine, $H_2C=C(H)CN$ and hydrogen over a nickel catalyst. The amine is reacted with hard or soft tallow fatty acid, oleic acid, canola acid or other unsaturated acids of varying iodine number. Fabric softeners of structure (V) are prepared by quaternizing, those of structure (IV). Fabric softeners of structure (VI) can, for example, be prepared by reacting epichlorohydrin with dimethylamine to produce 3-dimethylamino-1,2-propanediol followed by reacting the latter in the presence of a catalyst with hard or soft tallow fatty acid, oleic acid, canola acid or another unsaturated fatty acid of varying iodine number and quaternizing the product in the art-known manner. Other variations include amido analogs wherein NH replaces the in-chain —O— in structure (III). These can be prepared reacting hard or soft tallow fatty acid, oleic acid, canola acid or other unsaturated acids of varying iodine number with N-(2-hydroxyethyl)-N-(2-aminoethyl)ethylenediamine in the presence of a catalyst and reacting the intermediate product with $(CH_3O)_2SO_2$ in isopropanol or ethanol. Older fabric softeners include the conventional ditallowdimethylammonium chloride and ditallowdimethylammonium methylsulfate, prepared by reacting tallow alcohols with methylamine in the presence of a catalyst and quaternizing the intermediate dialkylmethylamine. Alternatively the intermediate can be reacted with 2-ethylhexanal first under dehydrating conditions, then in presence of hydrogen and a nickel catalyst to form an intermediate ethylhexyl-substituted tallowmethylamine which is then quaternized in the customary manner. More generally, any fabric softener active prepared from a fatty source, and preferably the biodegradable types, is useful herein. For recent reviews, see J. Surfactants Deterg. (1999), 2(2), 223–235 and Surfactant Sci. Ser. (1997), 67(Liquid Detergents), 433–462 and the numerous patent and other literature references therein. The fabric softener components herein can be formulated at widely ranging levels, for example from 0.001% to 10% by weight with a preferred level of fabric softening components from 1% to 5% by weight of a composition prior to final in-situ dilution in use. Commercial suppliers of fabric softeners include Stepan, Witco, Akzo, Clariant, Henkel and others.

Physical Form of Formulated Compositions

Compositions useful in conjunction with the processes of the present invention can have any suitable physical form as formulated, including powders, granules, tablets, liquids, gels, pastes, liquids or gels in dissolvable containers, and composite types, for example tablets with liquid, paste or gel inserts. Compositions for use herein can moreover be formulated in multicompartment containers.

Point-of-Use Compositions

In view of the fact that certain compositions herein can be prepared in the appliance using dosing or mixing systems to combine ingredients at the point of use, point-of-use compositions are defined herein as any composition formed in-situ by mixing two or more formulation components. Point-of-use compositions for use in the present process are encompassed in the present invention.

Phase Structure

Compositions useful herein, whether to be sold in pre-prepared form or as prepared by mixing ingredients at the point of use, can have widely varying phase structure. This includes emulsions, microemulsions, dispersions, and macroemulsions having a range of stability.

Preferred Compositons

In the following examples, all percentages are by weight unless specifically indicated.

EXAMPLE 1

Fabric Article Refreshment Composition

One particularly preferred composition for use herein, which can be preformulated or prepared in-situ as a "point of use" composition for fabric article refreshment, is a composition comprising: 2000–3000 ppm of a fabric softener, preferably a diesterquat mixture having as principal component, for example, more than about 30% of the compound of structure (III) supra, derived from canola, rapeseed or the like and having an iodine value of about 40 or higher; such materials are commercially available from Witco or Akzo; 1% of a coupling solvent, e.g., an alcohol, in a preferred example ethanol; and the balance, i.e., 98%+ of the composition, as lipophilic fluid, is cyclopentasiloxane e.g., D5 available from General Electric.

EXAMPLE 2

Fabric Article Refreshment Composition

In another suitable composition, as compared with Example 1, the level of fabric softener is increased to about 2% to about 3% by weight and dipropylene glycol dimethyl ether (Proglyde DMM, Dow). is used as lipophilic fluid instead of D5, at a level of about 97%.

EXAMPLE 3

Perfumed and/or Colored Variants

In each of the above examples, optionally but preferably, about 0.01% to about 0.5% of the lipophilic fluid can be replaced by perfume and/or colorant.

EXAMPLE 4

Fabric Article Cleaning Composition

Another preferred composition for use herein, which can be preformulated on prepared in-situ as a "point of use" composition for fabric article cleaning is a composition comprising:

| | |
|---|---|
| Cyclopentasiloxane, GE Silicone Fluid SF-1528 | 50% |
| GE Silicone Fluid SF-1488 | 50% |

EXAMPLE 5

Fabric Article Cleaning Composition

| | |
|---|---|
| Tergitol 15-S-9 | 59.5% |
| C11.8 LAS, TEA neutralized | 20% |
| 1,2 hexane diol | 0.5% |
| water | 20% |

EXAMPLE 6

Fabric Article Cleaning Composition

This example is to illustrate an aqueous cleaning composition used in one embodiment of the process of the invention, in which first an aqueous cleaning system is used and then a lipophilic cleaning fluid-containing composition is used.

Concentrated Aqueous System

Liquid Tide High Efficiency or Liquid Tide (2–8%) and water (balance, or a mixture of ethyl lactate and water 20:80 by weight)

Lipophilic Cleaning Fluid Refreshment System Composition of Example 1

EXAMPLE 7

Fabric Article Cleaning Composition

| | |
|---|---|
| D5 cyclopentasiloxane | 85% |
| Water | 10% |
| GE Silicone Fluid SF-1528 | 2.5% |
| GE Silicone Fluid SF-1488 | 2.5% |

EXAMPLE 8

Fabric Article Cleaning Composition

| | |
|---|---|
| C12 fatty methyl ester | 87.4% |
| Tergitol 15-S-9 | 7.5% |
| C11.8 LAS, TEA neutralized | 2.5% |
| 1,2 hexane diol | 0.06% |
| water | balance | where
LAS is linear alkyl benzene sulfonic acid
TEA is triethanolamine

EXAMPLE 9

Fabric Article Cleaning Composition

| | | |
|---|---|---|
| Ethyl lactate | 85% | 90% |
| water | 14.8% | 9.8% |
| Liquid Tide HE | 0.2% | 0.2% |

Example 5

EXAMPLE 10

Fabric Article Cleaning Composition

| | |
|---|---|
| dipropylene glycol dimethyl ether | 85% |
| Tergitol 15-S-9 | 3.7% |
| C11.8 LAS, TEA neutralized | 1.3% |
| water | 10% | where
LAS is linear alkyl benzene sulfonate
TEA is triethanolamine

EXAMPLE 11

Fabric Article Cleaning and Refreshment Composition Kit

Package varying amounts of the compositions and/or any individual ingredients and/or mixtures of ingredients of any of the above Examples in separate bottles with an applied shrink-wrap and usage instructions.

What is claimed is:

1. A process for treating fabric articles, comprising the steps of:
   (a) in a first laundering appliance, washing a load of fabric articles in the presence of a predominant fluid and at least one cleaning composition comprising a surfactant;
   (b) in said first laundering appliance, at least partially removing said cleaning composition from said load of fabric articles;
   (c) in said first laundering appliance, at least one step of treating said load of fabric articles with a fabric article refreshment composition comprising a component selected from the group consisting of a fabric softener, a perfume, a colorant, and mixtures thereof, in the presence of a lipophilic cleaning fluid;
   (d) in said first laundering appliance, removing said lipophilic cleaning fluid from said fabric articles; and
   (e) recovering said lipophilic cleaning fluid;
   wherein the lipophilic fluid is selected from the group consisting of linear and cyclic siloxanes, glycol ethers, and mixtures thereof; and wherein the predominant fluid in step (a) and the lipophilic cleaning fluid in step (c) are chemically different.

2. A process according to claim 1 wherein step (a) is selected from:
   (i) an immersive washing step wherein water is said predominant fluid;
   (ii) a non-immersive washing step wherein water is said predominant fluid;
   (iii) an immersive washing step wherein a lipophilic cleaning fluid is said predominant fluid;
   (iv) a non-immersive washing step wherein a lipophilic cleaning fluid is said predominant fluid;
   (v) an immersive washing step wherein a fluidized dense gas is said predominant fluid; and
   (vi) a non-immersive washing step wherein a fluidized dense gas is said predominant fluid.

3. A process according to claim 1 which is conducted without separating or grouping said fabric articles by color or by type.

4. A process according to claim 2 wherein step (a) is selected from (i), (ii), (iii) and (iv).

5. A process according to claim 1 wherein said surfactant in step (a) comprises a surfactant other than a nonionic surfactant.

6. A process according to claim 1 wherein said fabric articles are constructed of fabrics other than vinyl monomer grafted silk.

7. A process according to claim 1 wherein the sequence of steps is (a) followed by (b) followed by (c) followed by (d), and followed by (e).

8. A process according to claim 7 wherein (c) comprises the sequential steps of:
   (i) rinsing said load of fabric articles one or more times at least partially in the presence of a lipophilic cleaning fluid; and
   (ii) treating said load of fabric articles with the fabric article refreshment composition in the presence of said lipophilic cleaning fluid.

9. A process according to claim 1 wherein the predominant fluid in step (a) is selected from the group consisting of water, perchloroethylene, supercritical carbon dioxide, silicone, perfluorocarbons subcritical liquid carbon dioxide, hydrocarbons, and mixtures thereof.

* * * * *